United States Patent
Fujita et al.

(10) Patent No.: US 10,301,542 B2
(45) Date of Patent: May 28, 2019

(54) SCINTILLATOR AND ELECTRON DETECTOR

(71) Applicants: National University Corporation Shimane University, Matsue-shi, Shimane (JP); HAMAMATSU PHOTONICS K.K., Hamamatsu-shi, Shizuoka (JP)

(72) Inventors: Yasuhisa Fujita, Matsue (JP); Minoru Kondo, Hamamatsu (JP)

(73) Assignees: NATIONAL UNIVERSITY CORPORATION SHIMANE UNIVERSITY, Matsue-shi, Shimane (JP); HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/065,869

(22) PCT Filed: Dec. 9, 2016

(86) PCT No.: PCT/JP2016/086758
§ 371 (c)(1),
(2) Date: Jun. 25, 2018

(87) PCT Pub. No.: WO2017/115638
PCT Pub. Date: Jul. 6, 2017

(65) Prior Publication Data
US 2019/0023982 A1     Jan. 24, 2019

(30) Foreign Application Priority Data

Dec. 28, 2015    (JP) ................................ 2015-256014

(51) Int. Cl.
*C09K 11/54*     (2006.01)
*C09K 11/64*     (2006.01)
(Continued)

(52) U.S. Cl.
CPC ............ *C09K 11/642* (2013.01); *C09K 11/00* (2013.01); *C09K 11/54* (2013.01); *C09K 11/623* (2013.01);
(Continued)

(58) Field of Classification Search
CPC ............................ C09K 11/642; C09K 11/623
See application file for complete search history.

(56) References Cited

U.S. PATENT DOCUMENTS 7,538,330 B2 *   5/2009   Nomura ................ G01T 1/2018
                                                                 250/367
7,612,342 B1 *   11/2009   Nagarkar ............. C09K 11/616
                                                                       250/361 R
(Continued)

FOREIGN PATENT DOCUMENTS

JP       S58-129728 A      8/1983
JP      2003-222640 A      8/2003
(Continued)

OTHER PUBLICATIONS

P. A. Rodnyi et al., "Optical and Luminescence Properties of Zinc Oxide," Optics and Spectroscopy, 2011, pp. 776-785, vol. 111, No. 5.
(Continued)

*Primary Examiner* — Yara B Green
(74) *Attorney, Agent, or Firm* — Drinker Biddle & Reath LLP

(57) ABSTRACT

A scintillator includes a support substrate, an emission layer formed on the substrate, made of ZnO with impurities added to have an electron concentration of $2 \times 10^{19}$ cm$^{-3}$ or more and $2 \times 10^{20}$ cm$^{-3}$ or less, and for generating scintillation light in response to incidence of radiation, a protective layer formed on the emission layer and made of a material having a band gap wider than that of ZnO, and a metal layer formed (Continued)

on the protective layer. The support substrate is made of a material transmitting the scintillation light generated in the emission layer. Further, the metal layer functions as a reflection layer for reflecting the scintillation light from the emission layer.

12 Claims, 10 Drawing Sheets

(51) Int. Cl.
*C09K 11/00* (2006.01)
*G01T 1/20* (2006.01)
*G21K 4/00* (2006.01)
*H01J 40/18* (2006.01)
*C09K 11/62* (2006.01)

(52) U.S. Cl.
CPC ............. *G01T 1/20* (2013.01); *G01T 1/2002* (2013.01); *G01T 1/2018* (2013.01); *G21K 4/00* (2013.01); *H01J 40/18* (2013.01)

(56) References Cited

U.S. PATENT DOCUMENTS

| | | | | |
|---|---|---|---|---|
| 7,923,697 | B2* | 4/2011 | Gally | G01T 1/20 250/361 R |
| 9,006,662 | B2* | 4/2015 | Kato | G01T 1/202 250/361 R |
| 2010/0123129 | A1* | 5/2010 | Yamamuro | C23C 14/086 257/43 |
| 2011/0198505 | A1* | 8/2011 | Ishida | G01T 1/202 250/363.01 |
| 2013/0001425 | A1* | 1/2013 | Nakatsugawa | G01T 1/2018 250/366 |
| 2015/0204987 | A1* | 7/2015 | Okada | G01T 1/2018 250/369 |
| 2015/0323685 | A1* | 11/2015 | Nelson | G01T 1/1611 250/370.08 |

FOREIGN PATENT DOCUMENTS

| | | |
|---|---|---|
| JP | 2003-231878 A | 8/2003 |
| JP | 2004-311171 A | 11/2004 |
| JP | 2008-308725 A | 12/2008 |
| JP | 2009-286856 A | 12/2009 |
| JP | 2010-280533 A | 12/2010 |
| JP | 2010-280826 A | 12/2010 |
| JP | 2011-141134 A | 7/2011 |
| JP | 2012-1662 A | 1/2012 |
| JP | 2013-212969 A | 10/2013 |
| JP | 2014-144992 A | 8/2014 |
| JP | 2015-17972 A | 1/2015 |
| WO | WO-2005/114256 A1 | 12/2005 |

OTHER PUBLICATIONS

John S. Neal et al., "Evaluation of Melt-Grown, ZnO Single Crystals for Use as Alpha-Particle Detectors," IEEE Transactions on Nuclear Science, Jun. 2008, pp. 1397-1403, vol. 55, No. 3.

Zhehui Wang et al., "Thin scintillators for ultrafast hard X-ray imaging," Photon Counting Applications 2015, Proc. of SPIE, pp. 95040N-1-95040N-11, vol. 9504.

Toshihiko Shimizu et al., "Response Time-Shortened Zinc Oxide Scintillator for Accurate Single-Shot Synchronization of Extreme Ultraviolet Free-Electron Laser and Short-Pulse Laser," Applied Physics Express, 2011, pp. 062701-1-062701-3, vol. 4.

Y. Hiragino et al., "Improved transport properties for ZnO films on $Al_2O_3$ (1120) by MOCVD," Physica Status Solidi C, 2014, pp. 1369-1372, vol. 11, No. 7-8.

International Preliminary Report on Patentability dated Jul. 12, 2018 for PCT/JP2016/086758.

* cited by examiner

Fig.4

| MATERIAL | ZnO | SiO$_2$ | Al$_2$O$_3$ | MgO | CaF$_2$ | BeO | MgF$_2$ | LiF |
|---|---|---|---|---|---|---|---|---|
| BAND GAP (eV) | 3.4 | 7.9 | 7.5 | 7.8 | 10 | 10.6 | 11.8 | 13.6 |

SCINTILLATOR AND ELECTRON DETECTOR

TECHNICAL FIELD

The present invention relates to a scintillator used for detecting radiation such as electrons, and an electron detector using the scintillator.

BACKGROUND ART

A photodetector such as a photomultiplier tube to be used in a scanning electron microscope (SEM), a time of flight mass spectrometer (TOF-MS), or the like adopts a configuration in which a scintillator for converting an accelerated electron into light is provided at a preceding stage of the photodetector.

For example, the scanning electron microscope enables acquisition of images by accelerating secondary electrons from an observation object with acceleration voltage of about 12 kV, causing the electrons to be incident on a scintillator, and converting scintillation light generated in the scintillator into electric signals by a photodetector. In order to enhance throughput in such a device, it is necessary to increase electron scanning rate, and at the same time, reduce a fluorescence lifetime (decay characteristic) of scintillation light generated in the scintillator.

Further, in the time of flight mass spectrometer, mass spectrometry of ions is performed as follows, ions as a mass spectrometry object are converted with a micro channel plate (MCP) into electrons, the electrons are converted by a scintillator into light, and the generated scintillation light is further converted by a photodetector into electric signals, and time difference is measured. Similarly in such a device, it is necessary to reduce a fluorescence lifetime of scintillation light in the scintillator.

CITATION LIST

Patent Literature

Patent Document 1: Japanese Patent Application Laid-Open Publication No. 2013-212969
Patent Document 2: Japanese Patent Application Laid-Open Publication No. 2014-144992
Patent Document 3: Japanese Patent Application Laid-Open Publication No. 2012-1662
Patent Document 4: Japanese Patent Application Laid-Open Publication No. 2011-141134
Patent Document 5: Japanese Patent Application Laid-Open Publication No. 2010-280826
Patent Document 6: Japanese Patent Application Laid-Open Publication No. 2010-280533
Patent Document 7: Japanese Patent Application Laid-Open Publication No. 2009-286856
Patent Document 8: International Publication WO 2005/114256

Non Patent Literature

Non Patent Document 1: T. Shimizu et al., "Response Time-Shortened Zinc Oxide Scintillator for Accurate Single-Shot Synchronization of Extreme Ultraviolet Free-Electron Laser and Short-Pulse Laser", Applied Physics Express Vol. 4 (2011) pp. 062701-1-062701-3

Non Patent Document 2: Y. Hiragino et al., "Improved transport properties for ZnO films on Al2O3(1120) by MOCVD", Physica Status Solidi C Vol. 11 No. 7-8 (2014) pp. 1369-1372

SUMMARY OF INVENTION

Technical Problem

A fast response by a short fluorescence lifetime is required as described above for a scintillator used in the scanning electron microscope, the time of flight mass spectrometer, and the like. However, a general scintillator in practical use does not sufficiently achieve fast response since scintillation light has a fluorescence lifetime of about 20 nsec. Further, for example, in a plastic scintillator, a fluorescence lifetime is about 2.4 nsec, however, a plastic scintillator has a problem of early deterioration and the like.

Meanwhile, it has been known that a ZnO (zinc oxide) can be used as a fast response scintillator having a fluorescence lifetime of 1 nsec or less as a result of addition of impurities (see, for example, Patent Documents 1 to 8 and Non Patent Document 1). However, a conventional ZnO scintillator, which mainly uses a bulk single crystal, a crystal formed in liquid-phase epitaxy, and the like, has a problem in respect of control of impurities, processability, control of thickness, cost, productivity, and the like.

Further, the conventional ZnO scintillator uses crystals with a large layer thickness for the purpose of measuring a particles or the like. In the case of using such a scintillator for, for example, measuring a low-energy electron beam with a small penetration depth, strong fluorescence cannot be obtained due to self-absorption. Further, although a ZnO scintillator using nanoparticles has been proposed, such a scintillator has many defects, and cannot generate a sufficient amount of fluorescence.

The present invention has been made to solve the above problem, and an object thereof is to provide a scintillator which can be used preferably for detection of radiation such as electrons, and an electron detector using the scintillator.

Solution to Problem

To achieve the above object, a scintillator according to the present invention includes (1) a support substrate; (2) an emission layer formed on the support substrate, made of ZnO with impurities added with an electron concentration of $2 \times 10^{19}$ cm$^{-3}$ or more and $2 \times 10^{20}$ cm$^{-3}$ or less, and for generating scintillation light in response to incidence of radiation such as an electron; (3) a protective layer formed on the emission layer and made of a material having a band gap wider than that of ZnO; and (4) a metal layer formed on the protective layer, and (5) the support substrate is made of a material transmitting the scintillation light generated in the emission layer, and the metal layer functions as a reflection layer for reflecting the scintillation light from the emission layer.

In the above-described scintillator, the emission layer made of ZnO, to which impurities have been added, is formed on the support substrate, and further, an electron concentration in the emission layer is set within a range of $2 \times 10^{19}$ cm$^{-3}$ or more and $2 \times 10^{20}$ cm$^{-3}$ or less. As a result of the setting of the electron concentration in the emission layer as described above, being a counterpart of carriers in recombination reduces a fluorescence lifetime, and further, enhances emission efficiency. Further, since defects in the crystal are compensated, defect luminescence with a long fluorescence lifetime is reduced. Further, a sufficiently increased electron concentration causes the lower part of a conduction band to be filled with electrons, and also causes an effective band gap to be wide, and as a result, the occurrence of self-absorption can be reduced.

Further, in the above configuration, the protective layer to protect ZnO being hygroscopic is formed on the ZnO emission layer, and further, the protective layer is made of a material having a band gap wider than that of ZnO. With such a protective layer provided as described above, it is possible to prevent electrons and holes generated in the emission layer from flowing out, and thus, emission efficiency can be enhanced. Further, the metal layer is formed on the protective layer. The metal layer functions as a reflection layer which reflects scintillation light from the emission layer, and this enhances efficiency in the use of scintillation light in detecting radiation. Based on the above, it is possible to realize a scintillator with fast response which can be used preferably for detection of radiation such as electrons.

Here, examples of radiation to be detected by the above-described scintillator include particles such as electrons, protons, neutrons, α particles, and ions, and electromagnetic waves such as a γ ray, an X ray, and light.

An electron detector according to the present invention includes the scintillator having the above configuration for outputting the scintillation light generated in the emission layer in response to incidence of an electron; and a photodetector for detecting the scintillation light output from the scintillator. Such an electron detector as described above enables electrons to be detected preferably by using a scintillator with fast response.

Advantageous Effects of Invention

According to the scintillator and the electron detector of the present invention, an emission layer made of ZnO with impurities added so as to have an electron concentration of $2 \times 10^{19}$ cm$^{-3}$ or more and $2 \times 10^2$ cm$^{-3}$ or less, a protective layer made of a material having a band gap wider than that of ZnO, and a metal layer functioning as a reflection layer for reflecting scintillation light from the emission layer are formed on a support substrate made of a material transmitting the scintillation light, thereby it is possible to realize a scintillator with fast response which can be used preferably for detection of radiation such as electrons.

BRIEF DESCRIPTION OF DRAWINGS

FIG. 4 is a table showing band gaps of materials constituting a protective layer.

DESCRIPTION OF EMBODIMENTS

Figure 1:
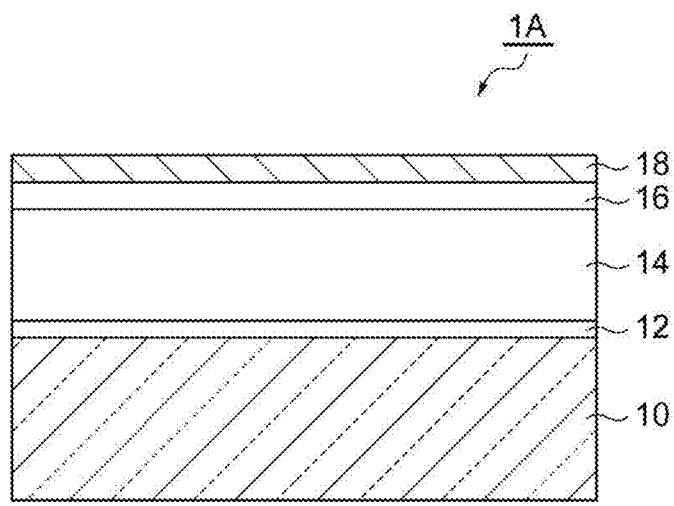
FIG. 1 is a side sectional view schematically showing a configuration of an embodiment of a scintillator.

Hereinafter, embodiments of a scintillator and an electron detector according to the present invention will be described in detail with reference to the drawings. In the description of the drawings, the same elements will be denoted by the same reference signs, without redundant description. Further, the dimensional ratios in the drawings are not always equal to those in the description.

FIG. 1 is a side sectional view schematically showing a configuration of an embodiment of a scintillator. A scintillator 1A according to the present embodiment is used for detecting radiation such as electrons, and includes a support substrate 10, a buffer layer 12, an emission layer 14, a protective layer 16, and a metal layer 18. Here, examples of radiation to be detected by the scintillator 1A of the present embodiment generally include particles such as electrons, protons, neutrons, α particles, and ions, and electromagnetic waves such as a γ ray, an X ray, and light, and further, as will be described below, the scintillator 1A can be used preferably for detection of for example, electrons with energy of 5 keV to 20 keV.

The support substrate 10 is a substrate made of a material which transmits scintillation light (fluorescence) generated in the emission layer 14 with sufficient transmittance. For example, an a-plane sapphire substrate can be used preferably as the support substrate 10. The emission layer 14 is formed on the support substrate 10, and generates scintillation light in response to incidence of radiation such as electrons. Further, the emission layer 14 in the present embodiment is made of a ZnO (zinc oxide) to which impurities have been added so as to have an electron concentration of $2 \times 10^{19}$ cm$^{-3}$ or more and $2 \times 10^{20}$ cm$^{-3}$ or less. Examples of impurities to be added to the emission layer 14 include Ga doped at a concentration of $2 \times 10^{19}$ cm$^{-3}$ to $4 \times 10^{20}$ cm$^{-3}$.

In the configuration example shown in FIG. 1, the buffer layer 12 made of ZnO is further formed between the support substrate 10 and the emission layer 14, and the emission layer 14 is formed on the buffer layer 12. The buffer layer 12 is made of, for example, ZnO to which no impurities have been added.

The protective layer 16 for protecting ZnO of the emission layer 14, having hygroscopic property, is formed on the impurity-added ZnO emission layer 14. Further, the protective layer 16 is made of a material having a band gap wider than that of ZnO. Based on the use of such a material, the protective layer 16 has a function to enhance characteristics and efficiency of detection of radiation performed by the scintillator 1A including the ZnO emission layer 14. Specifically, for example, $SiO_2$ can be used preferably as a material constituting the protective layer 16.

Further, the metal layer 18, which functions as a reflection layer for reflecting scintillation light from the emission layer 14, is formed on the protective layer 16. For example, Al can be used preferably as a material constituting the metal layer 18.

The effects of the scintillator 1A according to the present embodiment will be described below.

In the scintillator 1A shown in FIG. 1, the emission layer 14 made of ZnO, to which impurities (for example, Ga) have been added at a predetermined concentration, is formed on the support substrate 10. The ZnO scintillator with impurities added, as described above, attains a very short fluorescence lifetime of scintillation light of, for example, 1 ns or less, and thus, the scintillator has fast response.

Figure 2:
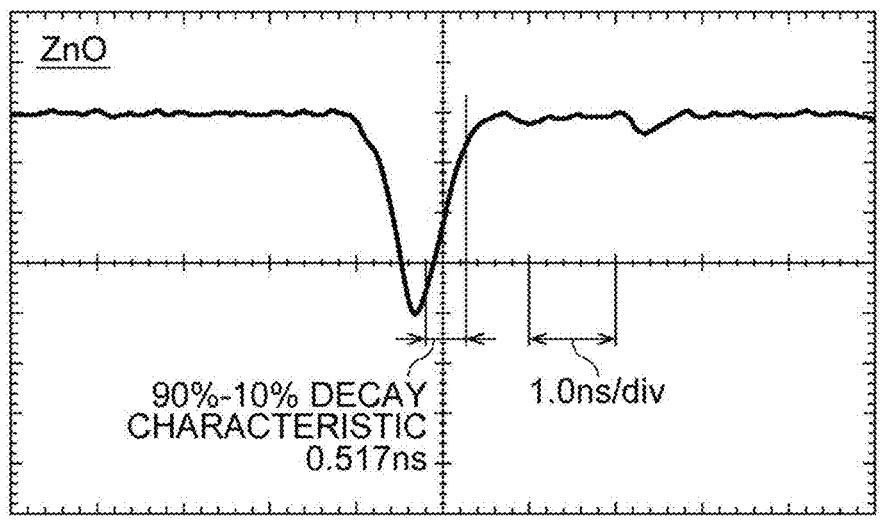
FIG. 2 includes graphs showing fluorescence lifetimes of (a) a ZnO scintillator, and (b) a plastic scintillator.
Figure 2:
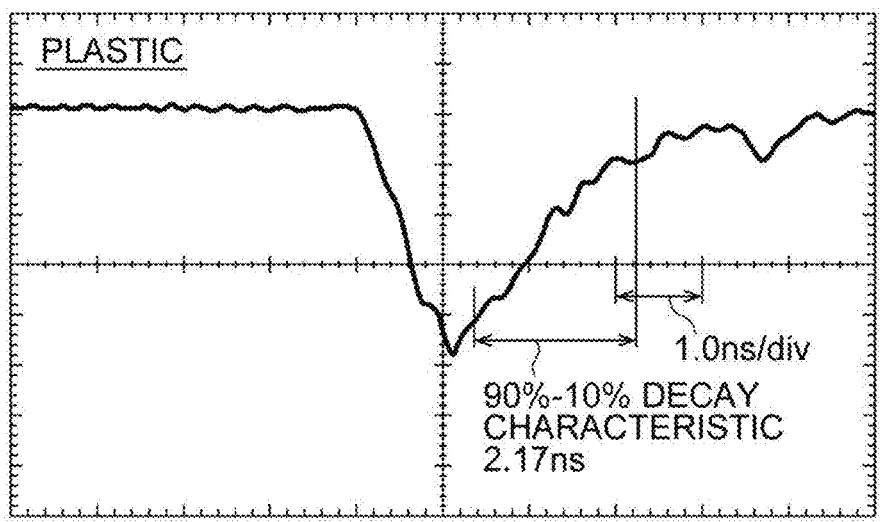

Here, FIG. 2 includes graphs showing fluorescence lifetimes of (a) a ZnO scintillator, and (b) a plastic scintillator. A graph of (a) in FIG. 2 shows a temporal waveform of scintillation light generated in the ZnO scintillator, and a graph of (b) in FIG. 2 shows a temporal waveform of scintillation light generated in the plastic scintillator, as a comparative example. As shown in these graphs, 90%-10% decay characteristic corresponding to fluorescence lifetime is 2.17 ns in the plastic scintillator, while 90%-10% decay characteristic is 0.517 ns in the ZnO scintillator, and thus, it is clear that the ZnO scintillator has fast response.

It is possible to set a scanning rate in a scanning electron microscope to be used for, for example, semiconductor inspection to 300 MHz or more, by reducing the fluorescence lifetime of scintillation light generated in the emission layer 14 to 1 ns or less as described above. Further, resolution of mass spectrometry can be enhanced in a time of flight mass spectrometer, compared to the conventional plastic scintillator.

Further, in the above scintillator 1A, the electron concentration in the impurity-added ZnO emission layer 14 is set within the range of $2\times10^{19}$ $cm^{-3}$ or more and $2\times10^{20}$ $cm^{-3}$ or less, based on, for example, the setting of concentration of impurities to be added. The electron concentration is set in the ZnO emission layer 14, and the electron concentration is increased by addition of impurities to ZnO as described above, and as a result, being a counterpart of excited carriers in recombination in the case of weak excitation intensity reduces the fluorescence lifetime of scintillation light, and further, enhances emission efficiency.

Further, since defects in the ZnO crystal are compensated by addition of impurities in the emission layer 14 of the above configuration, defect luminescence of a long fluorescence lifetime is reduced. Further, a sufficiently increased electron concentration causes the lower part of a conduction band to be filled with electrons, and also causes an effective band gap to be wide, and as a result, the occurrence of self-absorption can be reduced.

Further, in the above configuration, the protective layer 16 to protect ZnO, which is hygroscopic, is formed on the ZnO emission layer 14, and the protective layer 16 is made of a material (for example, $SiO_2$) having a band gap wider than that of ZnO. It is possible to further enhance emission efficiency in the emission layer 14 by providing the emission layer 14 with the protective layer 16 as described above. Here, the band gap of ZnO is 3.4 eV, and it is necessary to use a material having a band gap wider than 3.4 eV for forming the protective layer 16.

Further, in the above configuration, the metal layer 18 is further formed on the protective layer 16. The metal layer 18 functions as a reflection layer which reflects scintillation light from the ZnO emission layer 14, and this enhances output efficiency of scintillation light from the back surface of the support substrate 10, which is an output surface of light. Based on the above, it is possible to realize the scintillator 1A with fast response which can be used preferably for detection of radiation such as electrons.

Figure 3:
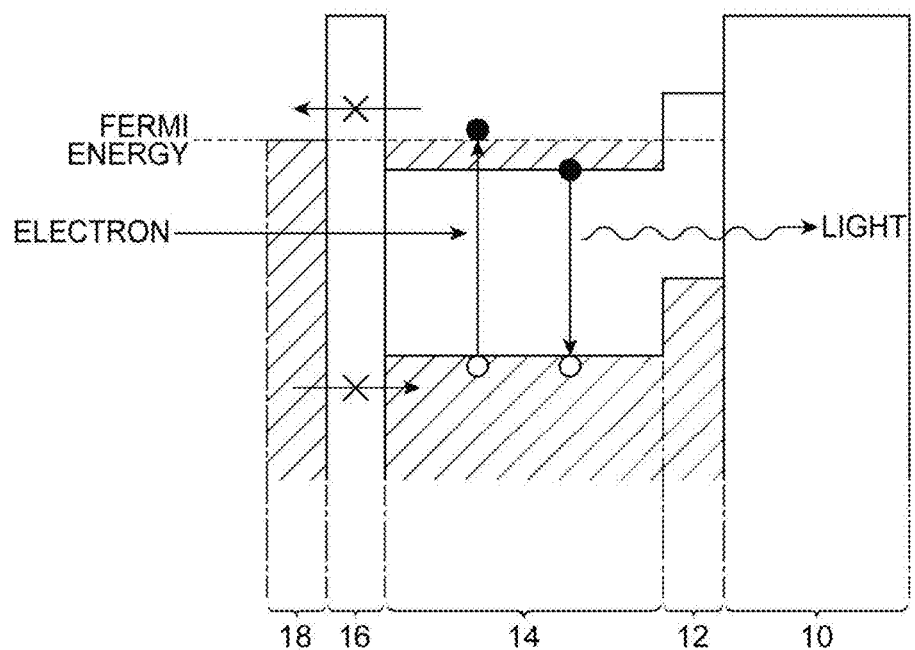
FIG. 3 is a band diagram showing a layer structure in the scintillator.

FIG. 3 is a band diagram showing the layer structure in the scintillator 1A shown in FIG. 1. Here, for simplicity, the band diagram of FIG. 3 shows only the magnitude of energy without consideration of bending of a band and the like due to a surface level or charge transfer. Further, for example, the spread of electron distribution due to thermal energy is ignored in the above band diagram. By providing the ZnO emission layer 14 with the protective layer 16 made of a material having a band gap wider than that of ZnO, as shown in FIG. 3, it is possible to prevent electrons and holes generated in the emission layer 14 from flowing out to the metal layer 18 of the outside, and thus, emission efficiency for incidence of radiation such as electrons can be enhanced.

Further, the electron concentration in the emission layer 14 has been sufficiently increased by addition of impurities as described above, and this increases the probability of recombination of holes and electrons generated by incidence of radiation, and enhances emission efficiency. Further, high-concentration impurities have been added to the emission layer 14, which is of an n-type, and this causes electrons to accumulate in the conduction band, as shown in FIG. 3. In this case, the energy level of the lower part of the conduction band is filled with electrons, and absorption and excitation due to, for example, incidence of radiation occur only under higher energy than this. Meanwhile, since emission of scintillation light occurs between electrons in the lower part of the conduction band and holes accumulated in the upper part of a valence band, energy thereof is lower than energy of absorption. Therefore, the emission layer 14 with an electron concentration set as described above can reduce the occurrence of self-absorption.

In the scintillator 1A of the above configuration, it is preferable that the emission layer 14 has a layer thickness of 0.5 μm or more and 3.0 μm or less. The scintillator 1A having the impurity-added ZnO emission layer 14 with the above layer thickness can be used preferably for detecting electrons having energy of about 5 keV to 20 keV in, for example, a scanning electron microscope and a time of flight mass spectrometer.

Here, when electrons are assumed to be radiation as a detection object, the penetration depth of electrons into ZnO is about 1 μm under acceleration voltage of 10 kV. In the case of, for example, a scanning electron microscope and a time of flight mass spectrometer, the acceleration voltage for electrons ranges from about 5 kV to 20 kV, and in this case, it is preferable to set the layer thickness of the emission layer 14 within a range from 0.5 μm to 3.0 μm, as described above. When the layer thickness of the emission layer 14 is larger than the above value, emission efficiency decreases due to self-absorption.

Further, it is preferable that impurities to be added to ZnO in the emission layer 14 include at least one impurity selected from the group consisting of Ga, Al, and In, and in particular, it is preferable that Ga is added to ZnO as impurities. Ga, Al, and In are all favorable donor impurities that supply conduction electrons to ZnO.

Further, in the scintillator 1A of the above configuration, the buffer layer 12 made of ZnO is formed between the support substrate 10 and the ZnO emission layer 14. It is possible to form the emission layer 14 preferably on the substrate 10, by forming the impurity-added ZnO emission layer 14 on the ZnO buffer layer 12 as described above.

The above buffer layer 12 and the emission layer 14 on the support substrate 10 can be formed preferably by, for example, the MOCVD method with good controllability of thin film formation. Further, in the case of providing the ZnO buffer layer 12 between the support substrate 10 and the emission layer 14 as describe above, it is preferable that the buffer layer 12 has a layer thickness of 20 nm or more and 400 nm or less. That is, it is preferable that the buffer layer 12 has a layer thickness of 20 nm or more so as to form a base of ZnO crystal. Meanwhile, in consideration of self-absorbability and high possibility of defect luminescence, it is preferable that the layer thickness of the buffer layer 12 is 400 nm or less. Here, if the ZnO buffer layer 12 is unnecessary, it is possible to adopt a configuration with no buffer layer provided.

With regard to the protective layer 16, which is formed on the emission layer 14 and made of a material having a band gap wider than that of ZnO, it is preferable that a material constituting the protective layer 16 includes at least one material selected from the group consisting of $SiO_2$, $Al_2O_3$, MgO, $CaF_2$, BeO, $MgF_2$, and LiF, and in particular, it is preferable that the protective layer 16 is made of $SiO_2$, which is a material chemically stable.

FIG. 4 is a table showing band gaps of materials constituting the protective layer 16. As shown in FIG. 4, it is clear that all the materials described above for the protective layer 16 have band gaps wider than that of ZnO. For example, while the band gap of ZnO is 3.4 eV, the band gap of $SiO_2$ is 7.9 eV. Further, it is preferable that the protective layer 16 has a layer thickness of 10 nm or more and 200 nm or less.

For example, a sapphire substrate, a quartz substrate, or a glass substrate can be used as the support substrate 10 made of a material that transmits scintillation light. Specific examples of the material of the support substrate 10 include a-plane sapphire, c-plane sapphire, quartz glass, UV transmitting glass (350 nm or more), and borosilicate glass. Further, it is in particular preferable to use an a-plane sapphire substrate as the support substrate 10 so that the ZnO emission layer 14 grows preferably on the support substrate 10.

It is preferable that Al is used as a material constituting the metal layer 18 formed on the protective layer 16. Further, metals other than Al can also be used as a material of the metal layer 18. Further, in the case of for example, Al being used as a material of the metal layer 18, it is preferable that the metal layer has a layer thickness of 10 nm or more and 50 nm or less so as to ensure a function as a reflection layer.

The configurations of an electron detector, a scanning electron microscope, and a time of flight mass spectrometer using the scintillator 1A of the above configuration will be described below.

Figure 5:
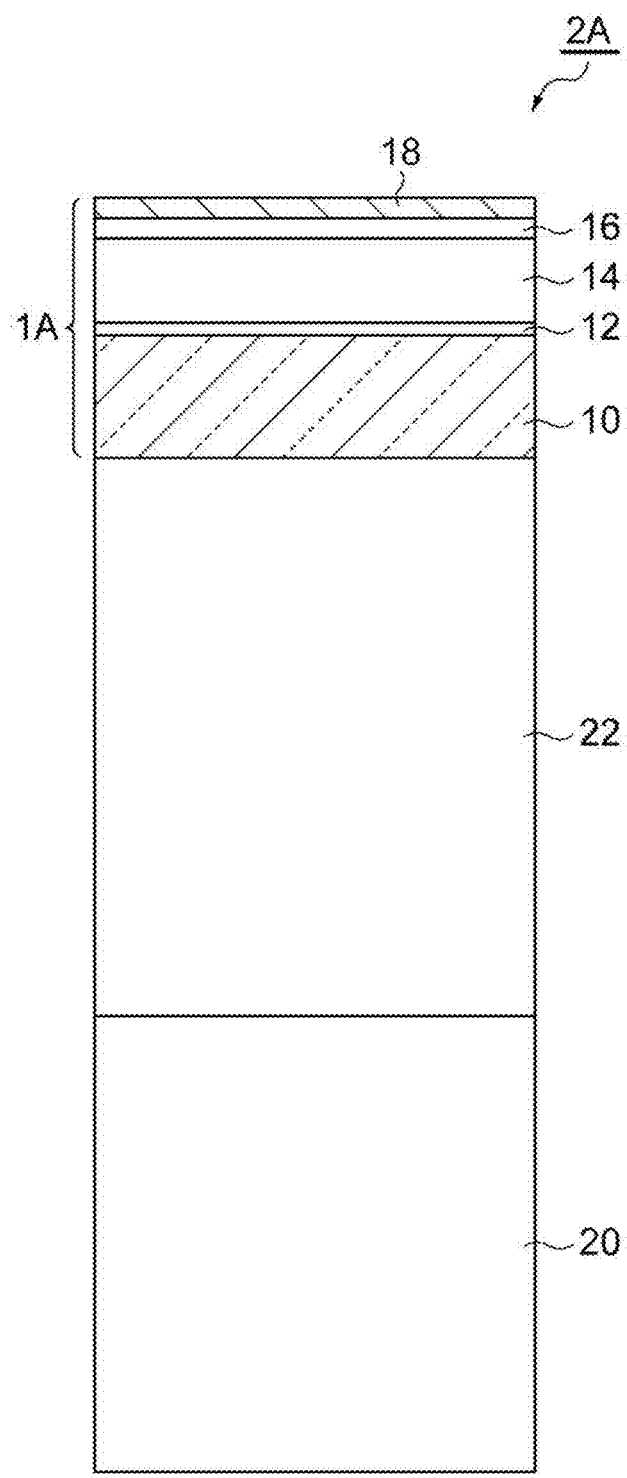
FIG. 5 is a side view showing a configuration of an embodiment of an electron detector.

FIG. 5 is a side view showing a configuration of an embodiment of an electron detector. An electron detector 2A according to the present embodiment includes the scintillator 1A, a photodetector 20, and a light guide 22. The scintillator 1A, which has the same configuration as that shown in FIG. 1, includes a support substrate 10, a buffer layer 12, an emission layer 14, a protective layer 16, and a metal layer 18. Here, FIG. 5 shows the cross-sectional structure of the scintillator 1A.

The photodetector 20 is optically coupled, via the light guide 22, to the back surface side of the support substrate 10 of the scintillator 1A, which is an output surface of light. Thus, scintillation light generated in the emission layer 14 of the scintillator 1A in response to incidence of electrons and output to the buffer layer 12 side passes through the support substrate 10 and the light guide 22, and reaches the photodetector 20 to be detected. Further, the scintillation light generated in the emission layer 14 and output to the protective layer 16 side passes through, in a similar manner, the support substrate 10 and the light guide 22 after being reflected by the metal layer 18 functioning as a reflection layer, and reaches the photodetector 20 to be detected.

The electron detector 2A of the above configuration enables electrons to be detected preferably by using the scintillator 1A with fast response. For example, a photomultiplier tube can be used as the photodetector 20 for detecting scintillation light output from the scintillator 1A. Further, a photodetection element other than a photomultiplier tube may be used as the photodetector 20. Further, if the light guide 22, which is used for guiding scintillation light between the scintillator 1A and the photodetector 20, is unnecessary, it is possible to adopt a configuration with no light guide provided.

Further, in the case of the electron detector 2A using the scintillator 1A, the following configuration may be adopted, the metal layer 18 in the scintillator 1A functions not only as a reflection layer for reflecting scintillation light, but also as an acceleration electrode for accelerating electrons which are incident from the outside on the scintillator 1A to be detected.

Figure 6:
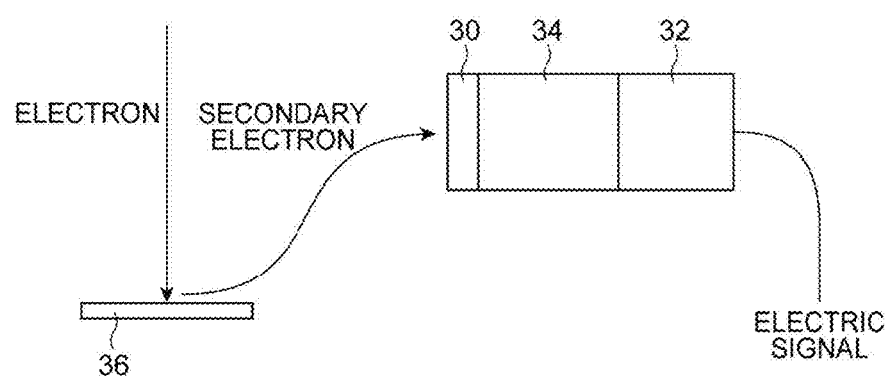
FIG. 6 is a diagram schematically showing a configuration of a scanning electron microscope.

FIG. 6 is a diagram schematically showing a configuration of a scanning electron microscope. In the configuration example shown in FIG. 6, an electron detector including a scintillator 30, a light guide 34, and a photodetector 32 is provided for an observation object 36. In the above device, the observation object 36 is irradiated with an electron beam, secondary electrons emitted from the object 36 are accelerated with predetermined voltage, and caused to be incident on the scintillator 30, scintillation light generated in the scintillator 30 is detected in the photodetector 32 via the light guide 34, and then, electric signals are output. In the configuration as described above, the scintillator 1A shown in FIG. 1 can be used as the scintillator 30 for converting electrons from the object 36 into light. Further, in the configuration as described above, the metal layer 18 of the scintillator 1A can be used as an electrode for accelerating electrons emitted from the observation object 36.

Figure 7:
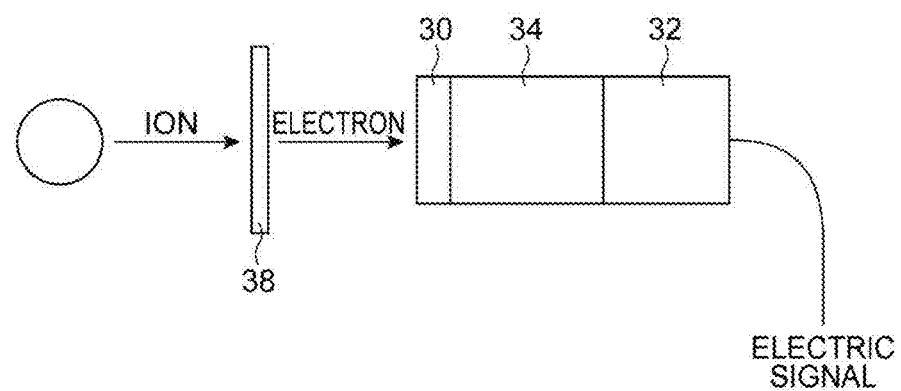
FIG. 7 is a diagram schematically showing a configuration of a time of flight mass spectrometer.

FIG. 7 is a diagram schematically showing a configuration of a time of flight mass spectrometer. In the configuration example shown in FIG. 7, the electron detector including the scintillator 30, the light guide 34, and the photodetector 32 is provided for a micro channel plate (MCP) 38. In the above device, ions as a mass spectrometry object are converted into electrons by the MCP 38, the electrons emitted from the MCP 38 are caused to be incident on the scintillator 30, scintillation light generated in the scintillator 30 is detected in the photodetector 32 via the light guide 34, and then, electric signals are output. In the configuration as described above, the scintillator 1A shown in FIG. 1 can be used as the scintillator 30 for converting electrons from the MCP 38 into light.

The configuration of the scintillator 1A according to the above embodiment will be further described below with a specific configuration example. Here, formation of a ZnO film by the MOCVD method can be seen in, for example, Non Patent Document 2 (Y. Hiragino et al., Physica Status Solidi C Vol. 11 No. 7-8 (2014) pp. 1369-1372).

In the present configuration example, an a-plane sapphire substrate with a thickness of 500 μm has been used as the support substrate 10, and the buffer layer 12 of a ZnO thin film with no impurities added has been formed with a film thickness of 250 nm on the substrate 10 by the MOCVD method. In forming the ZnO film, diethyl zinc has been used as a zinc (Zn) raw material, and tertiary butanol has been used as an oxygen (O) raw material. Further, the growth temperature has been set at 575° C., and the growth pressure has been set at 1000 hPa.

In addition, the emission layer 14 made of a ZnO single crystal thin film with Ga added has been formed on the above ZnO buffer layer 12, similarly by the MOCVD method. Here, triethyl gallium has been used as a gallium (Ga) raw material. Further, the protective layer 16 made of a $SiO_2$ film has been formed with a film thickness of 10 nm on the impurity-added ZnO emission layer 14 by the EB evaporation method. Further, the Al metal layer 18 with a layer thickness of 50 nm has been formed on the SiO$_2$ protective layer 16 by the vacuum evaporation method. Here, while the area of the scintillator 1A may be set to any value in accordance with, for example, the use of the scintillator, the area thereof has been set to 10 mm×10 mm here.

Figure 8:
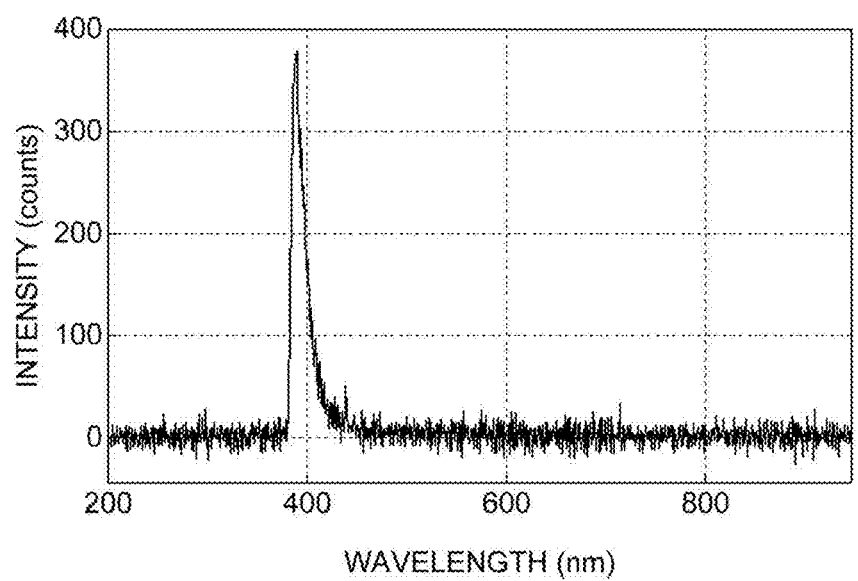
FIG. 8 is a graph showing a wavelength dependency of emission intensity in the scintillator.

FIG. 8 is a graph showing a wavelength dependency of emission intensity in the scintillator according to the above configuration example. In the graph of FIG. 8, the horizontal axis shows the wavelength (nm), and the vertical axis shows the emission intensity (counts) of scintillation light. The above graph shows the emission spectrum of cathodoluminescence under electron beam excitation (6 kV) in the case of the emission layer 14 with a layer thickness of 1.2 μm and an electron concentration of 6.7×10$^{19}$ cm$^{-3}$. It is clear from the emission spectrum that emission in the ZnO emission layer 14 has favorable characteristics in that the emission includes only band-edge emission with a short fluorescence lifetime, and includes no defect luminescence with a long fluorescence lifetime.

Figure 9:
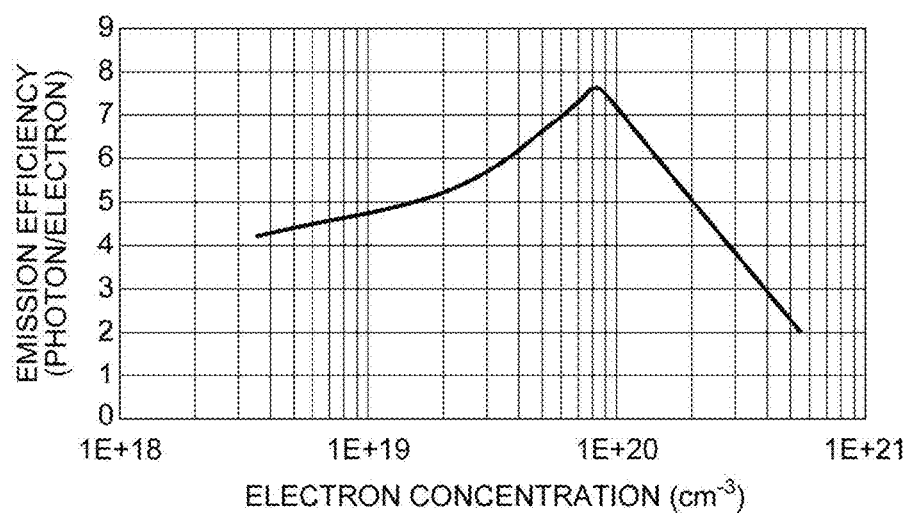
FIG. 9 is a graph showing an electron concentration dependency of emission efficiency.

FIG. 9 is a graph showing an electron concentration dependency of emission efficiency under electron beam excitation in the scintillator. In the graph of FIG. 9, the horizontal axis shows the electron concentration (carrier concentration) (cm$^{-3}$), and the vertical axis shows the emission efficiency (photon/electron).

As shown in the above graph, it is clear that emission intensity increases as the electron concentration in the emission layer 14 increases, while emission efficiency rapidly decreases when the electron concentration exceeds 10$^{20}$ cm$^{-3}$. This is caused by Auger effect that the energy of carrier recombination is absorbed by adjacent electrons due to the high electron concentration in the emission layer 14. In consideration of the above, it is preferable to set the electron concentration in the emission layer 14 within a range of 2×10$^{19}$ cm$^{-3}$ or more and 2×10$^{20}$ cm$^{-3}$ or less, as described above. Further, it is more preferable to set the electron concentration within a range of 5×10$^{19}$ cm$^{-3}$ or more and 2×10$^{20}$ cm$^{-3}$ or less Here, the above-described phenomenon regarding emission intensity is not effect of concentration of impurities to be added to ZnO, but effect of the electron concentration obtained by impurities. Therefore, not only Ga (gallium) but also group III elements such as Al (aluminum) and In (indium), which serve as favorable donor impurities for ZnO, may be used as impurities to be added to ZnO.

Figure 10:
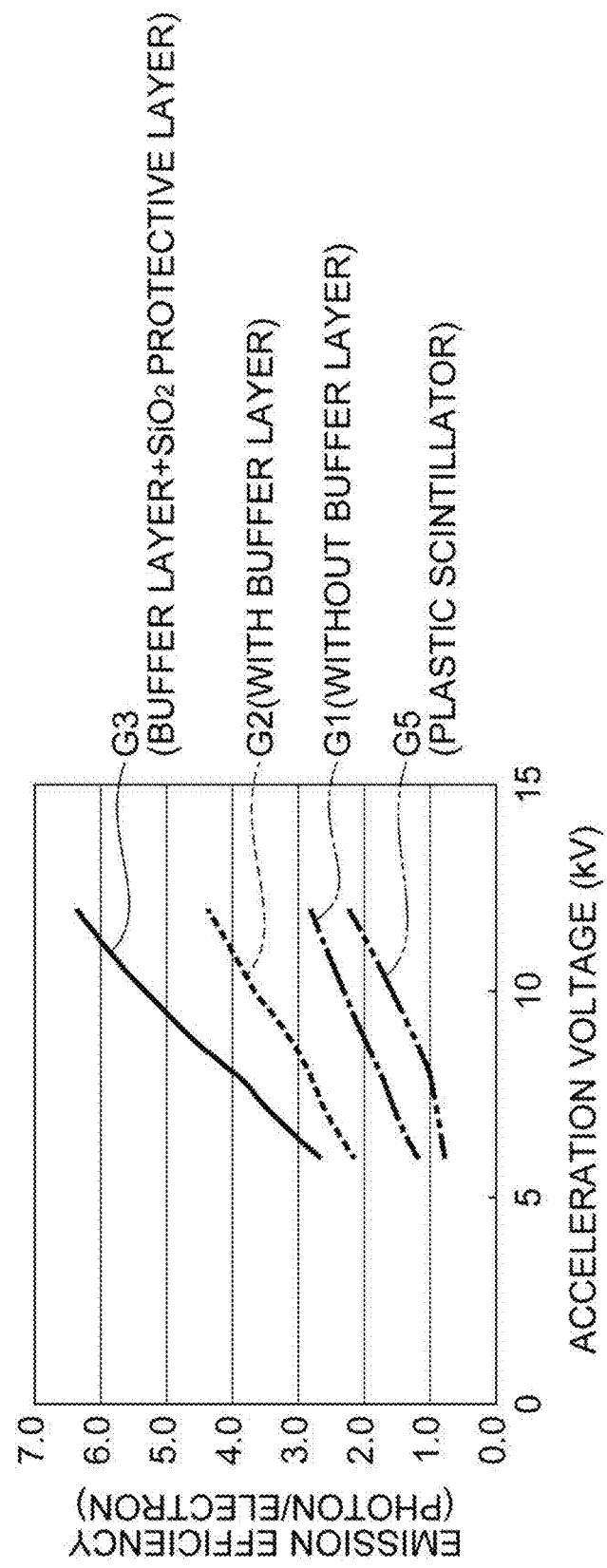
FIG. 10 is a graph showing an electron acceleration voltage dependency of emission efficiency.

FIG. 10 is a graph showing an electron acceleration voltage dependency of emission efficiency under electron beam excitation in the scintillator. In the graph of FIG. 10, the horizontal axis shows the acceleration voltage (kV) of an electron beam, and the vertical axis shows the emission efficiency (photon/electron). Further, in FIG. 10, a graph G1 shows emission efficiency in a configuration including no ZnO buffer layer 12, a graph G2 shows emission efficiency in a configuration including the buffer layer 12, and a graph G3 shows emission efficiency in a configuration including the SiO$_2$ protective layer 16 having a layer thickness of 10 nm as well as the buffer layer 12. Further, a graph G5 shows emission efficiency in a plastic scintillator as a comparative example.

As shown in the above graphs, it is clear that emission efficiency is enhanced by formation of the ZnO emission layer 14 on the support substrate 10 via the buffer layer 12 in the scintillator 1A of the above configuration. Further, providing the protective layer 16 made of a material having a band gap wider than that of ZnO on the side opposite to the support substrate 10 for the emission layer 14 in addition to the buffer layer 12 allows emission efficiency to more significantly increase.

Here, shielding effect of energy from the emission layer 14 to the outside by the SiO$_2$ protective layer 16 increases as the layer thickness increases, however, when the layer thickness of the protective layer 16 exceeds a certain value, the effect shows no change. In consideration of the above, it is preferable to set the layer thickness of the protective layer 16 within a range of 10 nm or more and 200 nm or less as described above. Further, examples of a material having a band gap wider than that of ZnO constituting the protective layer 16 include Al$_2$O$_3$, MgO, CaF$_2$, BeO, MgF$_2$, and LiF as well as SiO$_2$ as described above.

The scintillator and the electron detector according to the present invention are not limited to the above embodiments and configuration examples, and various modifications can be made. For example, the scintillator of the above configuration is applicable not only to the above electron detector, but also to other radiation detectors.

The scintillator according to the above embodiment includes (1) a support substrate; (2) an emission layer formed on the support substrate, made of ZnO with impurities added to have an electron concentration of 2×10$^{19}$ cm$^{-3}$ or more and 2×10$^{20}$ cm$^{-3}$ or less, and for generating scintillation light in response to incidence of radiation such as an electron; (3) a protective layer formed on the emission layer and made of a material having a band gap wider than that of ZnO; and (4) a metal layer formed on the protective layer, and (5) the support substrate is made of a material transmitting the scintillation light generated in the emission layer, and the metal layer functions as a reflection layer for reflecting the scintillation light from the emission layer.

Here, examples of radiation to be detected by the above-described scintillator include particles such as electrons, protons, neutrons, α particles, and ions, and electromagnetic waves such as a γ ray, an X ray, and light.

In the scintillator of the above configuration, it is preferable that the emission layer has a layer thickness of 0.5 μm or more and 3.0 μm or less. The scintillator having the impurity-added ZnO emission layer with the above layer thickness can be used preferably for detecting electrons having energy of 5 keV to 20 keV in, for example, a scanning electron microscope and a time of flight mass spectrometer. Further, it is preferable that the impurities to be added to ZnO in the emission layer include at least one element selected from the group consisting of Ga, Al, and In, and in particular, it is preferable that Ga is added to ZnO as impurities.

Further, in the scintillator of the above configuration, a buffer layer made of ZnO may be formed between the support substrate and the emission layer. It is thus possible to form the emission layer preferably by forming the impurity-added ZnO emission layer on the ZnO buffer layer.

Such a ZnO buffer layer and an emission layer as described above can be formed on the support substrate by, for example, the MOCVD (metal organic chemical vapor deposition) method. Further, in the case of providing the ZnO buffer layer between the support substrate and the emission layer as describe above, it is preferable that the buffer layer has a layer thickness of 20 nm or more and 400 nm or less.

With regard to the protective layer made of a material having a band gap wider than that of ZnO, it is preferable that the material constituting the protective layer includes at least one material selected from the group consisting of SiO$_2$, Al$_2$O$_3$, MgO, CaF$_2$, BeO, MgF$_2$, and LiF, and in particular, it is preferable that the material constituting the protective layer is $SiO_2$. Further, it is preferable that the protective layer has a layer thickness of 10 nm or more and 200 nm or less.

With regard to the support substrate made of the material that transmits the scintillation light, it is preferable that the support substrate is a sapphire substrate, a quartz substrate, or a glass substrate. Further, in particular, it is preferable that the support substrate is an a-plane sapphire substrate.

With regard to the metal layer formed on the protective layer, it is preferable that Al is used as a material constituting the metal layer. Further, in the case of Al being used as a material of the metal layer, it is preferable that the metal layer has a layer thickness of 10 nm or more and 50 nm or less.

The electron detector according to the above embodiment includes the scintillator having the above configuration for outputting the scintillation light generated in the emission layer in response to incidence of an electron, and a photodetector for detecting the scintillation light output from the scintillator. Such an electron detector as described above enables electrons to be detected preferably by using the scintillator with fast response. Further, in this case, the metal layer in the scintillator may be configured to function as an acceleration electrode for accelerating the electron incident on the scintillator.

INDUSTRIAL APPLICABILITY

The present invention can be used as a scintillator which can be employed preferably for detecting radiation such as electrons, and as an electron detector using the scintillator.

REFERENCE SIGNS LIST

1A—scintillator, 2A—electron detector, 10—support substrate, 12—ZnO buffer layer, 14—impurity-added ZnO emission layer, 16—protective layer, 18—metal layer, 20—photodetector, 22—light guide, 30—scintillator, 32—photodetector, 34—light guide, 36—observation object, 38—micro channel plate.

The invention claimed is:

1. A scintillator comprising:
a support substrate;
an emission layer formed on the support substrate, made of ZnO with impurities added to have an electron concentration of $2\times10^{19}$ cm$^{-3}$ or more and $2\times10^{20}$ cm$^{-3}$ or less, and configured to generate scintillation light in response to incidence of radiation;
a protective layer formed on the emission layer and made of a material having a band gap wider than that of ZnO; and
a metal layer formed on the protective layer, wherein
the support substrate is made of a material transmitting the scintillation light generated in the emission layer, and the metal layer functions as a reflection layer configured to reflect the scintillation light from the emission layer.

2. The scintillator according to claim 1, wherein the emission layer has a layer thickness of 0.5 µm or more and 3.0 µm or less.

3. The scintillator according to claim 1, wherein the impurities to be added to ZnO in the emission layer include at least one element selected from the group consisting of Ga, Al, and In.

4. The scintillator according to claim 1, wherein a buffer layer made of ZnO is formed between the support substrate and the emission layer.

5. The scintillator according to claim 4, wherein the buffer layer has a layer thickness of 20 nm or more and 400 nm or less.

6. The scintillator according to claim 1, wherein the material constituting the protective layer includes at least one material selected from the group consisting of $SiO_2$, $Al_2O_3$, MgO, $CaF_2$, BeO, $MgF_2$, and LiF.

7. The scintillator according to claim 1, wherein the protective layer has a layer thickness of 10 nm or more and 200 nm or less.

8. The scintillator according to claim 1, wherein the support substrate is a sapphire substrate, a quartz substrate, or a glass substrate.

9. The scintillator according to claim 1, wherein the support substrate is an a-plane sapphire substrate.

10. The scintillator according to claim 1, wherein a material constituting the metal layer is Al.

11. An electron detector comprising:
the scintillator according to claim 1 configured to output the scintillation light generated in the emission layer in response to incidence of an electron; and
a photodetector configured to detect the scintillation light output from the scintillator.

12. The electron detector according to claim 11, wherein the metal layer in the scintillator functions as an acceleration electrode configured to accelerate the electron incident on the scintillator.

* * * * *